(12) United States Patent
Aroca Hernandez-Ros et al.

(10) Patent No.: US 10,607,464 B2
(45) Date of Patent: Mar. 31, 2020

(54) INDUCTIVE SYSTEM FOR DATA TRANSMISSION/RECEPTION BY MEANS OF LOCKING THE GENERATION OF HARMONICS ON A FERROMAGNETIC CORE

(71) Applicant: UNIVERSIDAD POLITECNICA DE MADRID, Madrid (ES)

(72) Inventors: Claudio Aroca Hernandez-Ros, Madrid (ES); Pedro Cobos Arribas, Madrid (ES); Marina Perez Jimenez, Madrid (ES); Jose Luis Perez Fernandez, Madrid (ES)

(73) Assignee: UNIVERSIDAD POLITÉCNICA DE MADRID, Madrid (ES)

( * ) Notice: Subject to any disclaimer, the term of this patent is extended or adjusted under 35 U.S.C. 154(b) by 0 days.

(21) Appl. No.: 16/233,279

(22) Filed: Dec. 27, 2018

(65) Prior Publication Data
US 2019/0197854 A1 Jun. 27, 2019

(30) Foreign Application Priority Data
Dec. 27, 2017 (ES) .................................. 201731478

(51) Int. Cl.
*G08B 13/24* (2006.01)
*H01Q 7/06* (2006.01)
(52) U.S. Cl.
CPC ..... *G08B 13/2448* (2013.01); *G08B 13/2408* (2013.01); *G08B 13/2414* (2013.01); *H01Q 7/06* (2013.01)
(58) Field of Classification Search
CPC .............. G08B 13/24; G08B 13/2408; G08B 13/2414; G08B 13/242; G08B 13/2448;
(Continued)

(56) References Cited

U.S. PATENT DOCUMENTS 4,309,697 A * 1/1982 Weaver .............. G08B 13/2408
340/572.2
4,384,281 A * 5/1983 Cooper .............. G08B 13/2408
340/572.2
(Continued)

FOREIGN PATENT DOCUMENTS

JP 05328454 A 12/1993

OTHER PUBLICATIONS

Hubert Zangl et al. Wireless Communication and Power Supply Strategy for Sensor Applications Within Closed Metal Walls. IEEE Transactions on Instrumentation and Measurement, Jun. 1, 2010 IEEE Service Center, Piscataway, NJ, US. , Jan. 6, 2010, vol. 59, pp. 1686-1692, XP011308520 ISSN 0018-9456.
(Continued)

*Primary Examiner* — Van T Trieu
(74) *Attorney, Agent, or Firm* — Brooks Kushman P.C.

(57) ABSTRACT

The system performs communication between two systems, a master system, that creates an alternating magnetic field by means of which it dialogues with one or more slave systems, which respond at frequencies other than those generated by the master by a non-linear magnetic core generating harmonics of higher order than those of the magnetic field created by the master. The generation of harmonics is controlled by the slave by a short-circuit coil which enables the data transmission from the slave to the master. The slave system can have its own power supply or it can be powered by the short-circuit coil. This allows microcontrollers in the slaves to be powered and give them intelligence and a large storage capacity, making them ideal for control security and monitoring processes. The excitation frequency can be varied because the functionality of the slaves does not depend on the frequency of the exciter field.

11 Claims, 3 Drawing Sheets

(58) Field of Classification Search
CPC ............ G08B 13/2411; G08B 13/2417; G08B 13/2941; H01Q 7/025; H01Q 7/06; H01Q 7/08; H04B 5/00; H04B 5/0025; H04B 5/0043; H04B 5/0056; H04B 5/0062; H04B 5/0068; H04B 5/0075; H04B 5/0081; H04B 5/0087; H04B 5/0093; H04B 5/02
See application file for complete search history.

(56) References Cited

U.S. PATENT DOCUMENTS

| | | | | |
|---|---|---|---|---|
| 5,414,410 | A * | 5/1995 | Davies | G08B 13/2408 340/551 |
| 8,929,813 | B2 * | 1/2015 | Andersen | G06K 7/0008 455/41.1 |
| 10,333,352 | B2 * | 6/2019 | Von Novak, III | H02J 50/12 |
| 2017/0288461 | A1 * | 10/2017 | Konanur | H04B 5/0037 |
| 2019/0074706 | A1 * | 3/2019 | Wittenberg | H02J 50/10 |
| 2019/0074724 | A1 * | 3/2019 | Wittenberg | H02J 50/10 |
| 2019/0074729 | A1 * | 3/2019 | Wittenberg | H02J 50/40 |

OTHER PUBLICATIONS

International Search Report and Written Opinion for Application No. ES2017/31478, dated Apr. 30, 2018, 7 pages.
English Translation of Written Opinion for Application No. ES2017/31478, dated Apr. 30, 2018, 3 pages.

* cited by examiner

INDUCTIVE SYSTEM FOR DATA TRANSMISSION/RECEPTION BY MEANS OF LOCKING THE GENERATION OF HARMONICS ON A FERROMAGNETIC CORE

CROSS-REFERENCE TO RELATED APPLICATIONS

This application claims the benefit of Spanish Patent Application No. P201731478 filed 27 Dec. 2017, the disclosure of which is hereby incorporated in its entirety by reference herein.

TECHNICAL FIELD

The present invention relates to a system for transmitting data by means of controlling the generation of harmonics on a magnetic core excited by an alternating magnetic field. More specifically, this invention allows a master device to communicate with slave(s) by means of magnetic fields at one or various frequencies and for the slave(s) to respond with magnetic fields with a frequency that is a multiple of the emitting frequency.

The system belongs to a wide spectrum of application in systems for identifying objects, especially, given its versatility, in monitoring industrial processes or breeding animals and their subsequent processing for the food industry. Although its use can be extended to the scope of security and monitoring and traceability of goods.

The system is preferably provided for the development of smart, programmable, readable and recordable systems that communicate by means of inductive processes (Smart Induction Programmable Devices; SIPD) which we expect to have a wide range of application in the control and monitoring of products.

BACKGROUND

There is currently great interest in the transmission of information without electrical contacts between a system supplied by a power source, master and slave(s) that receive the operational power by way of signals generated by the primary system. One example of these applications is the RFID and near-field induction communication systems. All these systems are based on the master generating an electromagnetic field, by means of an antenna system, captured by antennas situated on the slave. The voltage generated in these antennas is used to power the circuit and transmit data from the master to the slave. This transmission can be carried out by means of modulating the amplitude, frequency, phase, etc. The modes of transmission from the slave to the master are very varied, including:

a) storing energy in a capacitor and using it to generate an electromagnetic field to transmit the data by modulating the amplitude, frequency, phase . . . this method involves the master transmitting a field, shutting down the transmission and upon completing this, the slave generates its response generally at the same working frequency of the master.

b) modulating the energy dissipated by the antenna of the slave, which is translated into changes in the quality factor of the transmitter circuit of the master.

c) using two antennas in the slave: one transmitting and another receiving. This allows master-slave transmission at one frequency and slave-master transmission at a different frequency.

In general, all these transmission methods are based on resonant systems where the antenna, which is generally a loop antenna, is coupled to a capacitor to syntonize a determined frequency. In some cases, in order to reduce the size of the antenna, a winding with a ferritic core is used, maintaining the antenna working as a linear device.

The closest prior art is the system described in the Spanish patent with publication number ES 2251315 B2. It is based on detecting a magnetic material magnetized by an external exciter field generated by the master. The magnetic material is situated inside a short-circuitable cable such that the magnetization of the material is modified upon opening and closing the circuit. These magnetization changes at the same frequency as the exciter field are detected by a dual-phase demodulation system. The master and the slave have the same transmission and reception frequency, therefore a system that is just as sensitive in detection as the dual-phase demodulation is required since the exciter field is much greater than that produced by the magnetic core, this also requires excellent signal compensation.

SUMMARY

The device of the present invention performs communications between two systems, a master that creates an alternating magnetic field by means of which it dialogues with one or a number of slave which respond at frequencies other than those generated by the master by means of a non-linear magnetic core generating harmonics of higher order than those of the magnetic field created by the master. The generation of harmonics is controlled by the slave by means of a short-circuit coil allowing the transmission of data from the slave to the master. The slave can have its own power supply (battery, mains) or it can be powered by the short-circuit coil. In the latter case, the transmission of energy is very efficient because it is not used in generating any current, the complete transmission energy is supplied by the master. This efficiency allows microcontrollers in the slaves to be supplied and gives them intelligence and a large storage capacity, making them ideal for control security and monitoring processes. The excitation frequency can be varied because the functionality of the slaves does not depend on the frequency of the exciter field.

Therefore, in a first aspect of the invention, an inductive system is disclosed for data transmission/reception by locking the generation of harmonics on a ferromagnetic core comprising:

a first data transceiver comprising:
  i) an element producing an exciter magnetic field B1 at a defined frequency "w" representative of data to be transmitted to at least one second data transceiver;
  ii) a harmonic detection system;

a data receiver comprising:
  i) a core of magnetic material with a non-linear magnetization which generates harmonics of higher order than the frequency of the exciter magnetic field B1;
  ii) a short-circuit coil BC with a resistive impedance at least one hundred times lower than the inductive impedance controlling the generation of harmonics which represents data to be transmitted to the first data transceiver; and wherein the harmonic detection system is syntonizable to harmonics of higher order than those generated by the second data transceiver.

The inductive system of data transmission/reception by locking the generation of harmonics on a ferromagnetic core does not have elements that are syntonizable in the first data transceiver such that the exciter field that generates the data transmission can have a wide range of frequencies which allows it to communicate with various data transceivers, changing the excitation frequency. The gap between the frequencies transmitted by the different data transmitters is expanded since they are integral multiples of the excitation frequency, therefore a small variation of the frequency of the first transceiver is translated into a large variation in the data transmission frequency.

In one embodiment, the short-circuit coil BC is switched by means of a switch controlled by an electronic circuit.

In one embodiment, an auxiliary winding situated in the data transmitter can power the electronic circuit controlling the switch of the short-circuit coil situated around the magnetic core such that the data transmission is carried out without interrupting the power supply of said electronic circuit.

In one embodiment, the voltage generated in the short-circuit coil to charge capacitors can power the electronic circuit controlling the switch of the short-circuit coil BC situated around the magnetic core to transmit data at a frequency different to the exciter field. The energy consumption required to activate the switch is very low since all the energy to transmit the data is supplied by the exciter field.

In one embodiment, the exciter magnetic field B1 varies its amplitude, frequency or phase to transmit data to the receiver, therefore being bidirectional.

In a second aspect of the invention, the use is disclosed of the inductive system for data transmission/reception by locking the generation of harmonics on a ferromagnetic core defined in any one of the preceding embodiments of the first aspect of the invention as a remote anti-theft system, capable of being deactivated or activated using the switch of the winding.

In a third aspect of the invention, a smart induction programmable device (SIPD) is disclosed, comprising the inductive system for data transmission/reception by locking the generation of harmonics on a ferromagnetic core according to any one of the embodiments of the first aspect of the invention.

In one embodiment, the smart induction programmable device (SIPD) comprises a microcontroller which allows data to be recorded and read remotely and therefore allows labels to be developed to monitor products with tamper-proof areas and/or a different security level, access for different operators, or users of the device, given the low consumption in transmitting data and its independence from the excitation frequency.

BRIEF DESCRIPTION OF THE DRAWINGS

In order to complement the description being made and with the object of helping to better understand the invention, said description is accompanied, as an integral part thereof, by a set of figures where, in an illustrative and non-limiting manner, the following has been represented.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention is based on data transmission between a master that queries and a slave that transmits the data to the master in response to the query. The response is carried out by means of a magnetic core situated in the slave. The magnetic core is excited by a magnetic field of frequency w, emitted by the master by means of the coil B1, FIG. 1.

The core has high magnetic permeability and a small demagnetizing factor such that under the action of the alternating saturated exciter magnetic field of frequency w, it generates odd harmonics of a higher order, if there is no superimposed continuous magnetic field. In the event there is a superimposed continuous field, it also generates even harmonics of a higher order.

Figure 1:
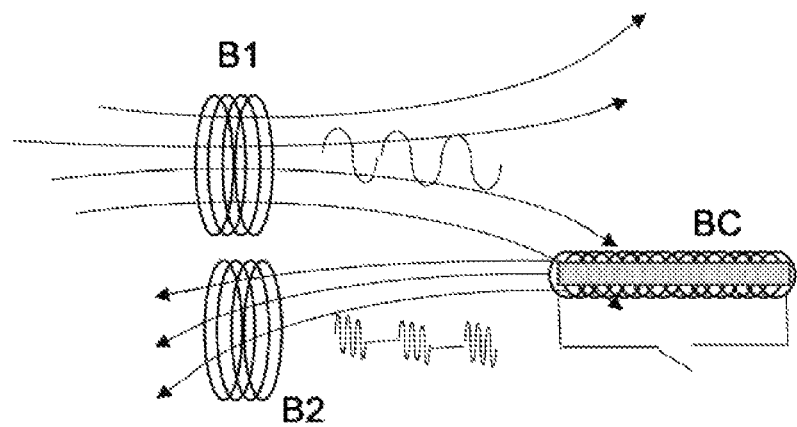
FIG. 1 shows a diagram of the invention, the winding B1 generates a magnetic field of w frequency, represented in the figure which acts on the magnetic core situated inside the short-circuit coil BC and generates signals of different frequency modulated by the data.

A solenoid, BC, FIG. 1, is situated around the magnetic core, with an electronically activatable switch which short circuits it. When the switch is closed, the generation of harmonics in the core is locked since the f.e.m induced in the solenoid:

$$\xi = w\, Bo\, S\, N \cos(w\, t)$$

the exciter field being $B = Bo\, sen(w\, t)$, $Bo$ the amplitude of the magnetic field, $S$ the effective section of the solenoid and $N$ the number of loops, it generates an intensity $I$:

$$I = \frac{-wBoSNsen(wt)(Lw)}{(Lw)^2 + R^2} + \frac{-wBoSNcos(wt)R}{(Lw)^2 + R^2} \quad L = \frac{SN^2\mu}{l}$$

being the self-induction of the solenoid, $l$ the length of the solenoid and $\mu$ the permeability of the medium. Therefore if $R \ll Lw$, the field created by the solenoid is $Bo\, sen(w\, t)$, therefore the total field in the interior is almost zero and the magnetic material is magnetized, weakly, only in the linear area, not generating greater harmonics. The attenuation of the harmonics of high frequency is more effective than the attenuation of the frequency of the first harmonic.

In the present invention, the data are transmitted from the slave to the master by way of the magnetic field, of different frequency to the excitation frequency, produced by the magnetic core, magnetized by the excited field created by the master. This field is detected by the winding B2, FIG. 1. The data are transmitted, sequentially locking by activating the switch, the harmonics generated by the magnetic core. Unlike the prior art, the data transmission is carried out at a frequency different to the frequency of the exciter field.

Using the present invention, all the energy required for the data transmission is supplied by the exciter field since the energy required to short circuit the solenoid is negligible. The system does not depend on the frequency of the exciter field, it works for any exciter frequency, provided R<<Lw.

Figure 2A:
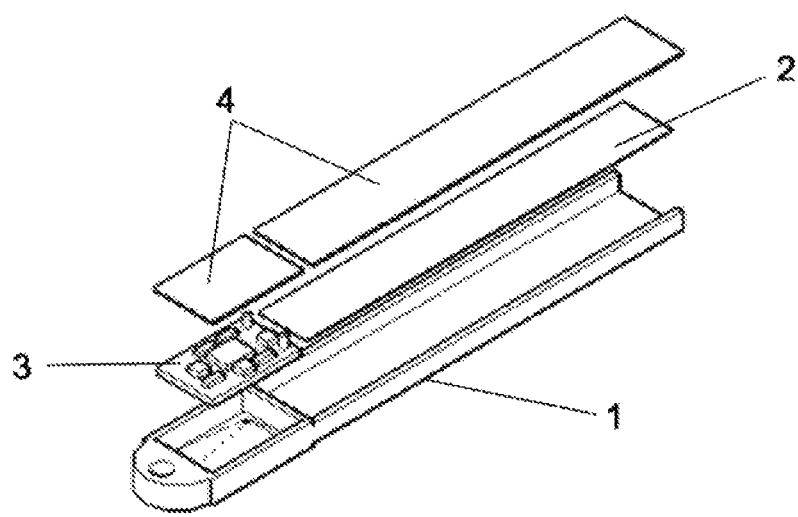
FIG. 2a shows the polymer holder with the microcircuit integrated therein and beside it the magnetic core that will be integrated in the lower space.
Figure 2B:
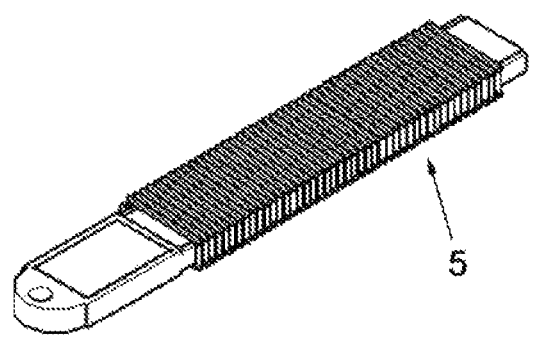
FIG. 2b shows the polymer holder with the microcircuit integrated therein, winding and the core in its interior (not visible). The device is completely encapsulated at the side.

FIG. 2a shows the polymer holder 1 with the electronic circuit 2, the magnetic core 3 and the covers 4 of an SIPD (smart induction programmable device). FIG. 2b shows the device with the same elements of FIG. 2a in their final encapsulation and with a winding 5 around the same.

Figure 3:
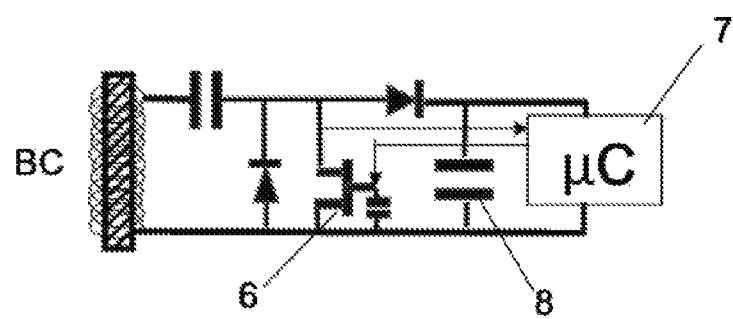
FIG. 3 shows the diagram of the electronic circuit of FIG. 2, the winding with the core, the switch (a MOSFET switch), the microcontroller, the power supply and the control signals are seen.

The complete diagram is shown in FIG. 3 where the output of the winding BC becomes a voltage doubler which is short-circuited with a MOSFET 6. The output of the µC 7 connected to the port of the MOSFET is used to short circuit the winding and thus to transmit data. The input to the µC is used to receive data by way of the exciter field. Since the input impedance of the MOSFET is very high, the system can be inhibited for indefinite periods, leaving in charge the capacitor 8 coupled to the port and the output of the µC 7 in high impedance.

Figure 4:
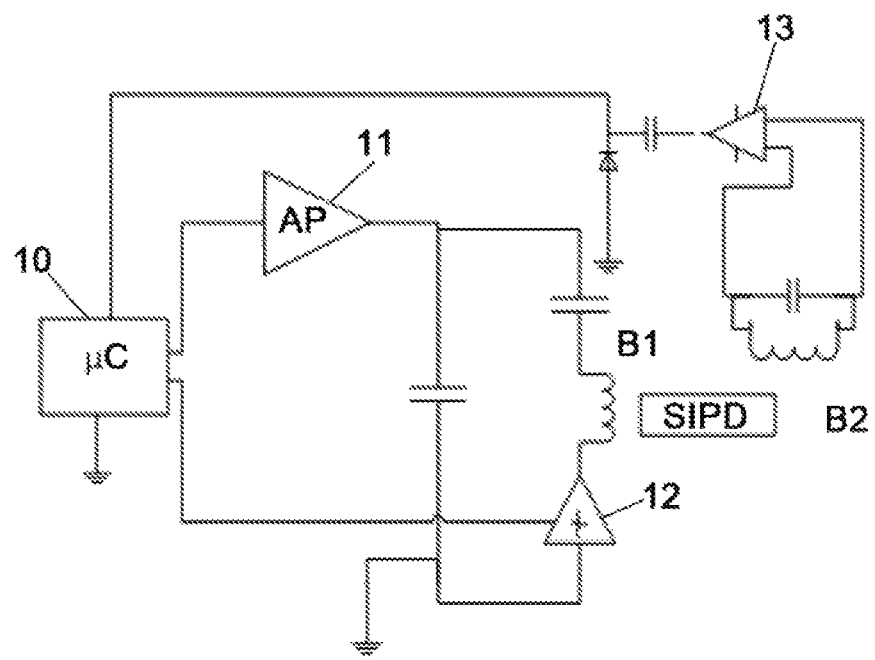
FIG. 4 shows a diagram of bidirectional communication of the master with the SIPD.

The transmission from the master to the slave is carried out using frequency modulation, with the circuit shown in FIG. 4. The microcontroller "µC" 10 generates two frequencies, one corresponding to logical "0" and the other to logical "1". The signals are amplified by the amplifier 11 and introduced into the transmission resonant circuit. The circuit of the transmitting antenna should resonate at two different frequencies, in order to achieve these two resonances, the impedances are adapted using a magnetic amplifier 12 in series with the winding producing the exciter field B1. The change in self-induction of the magnetic amplifier 12 allows the resonance of the circuit to be adjusted, allowing the impedances to be kept adapted.

Figure 5:
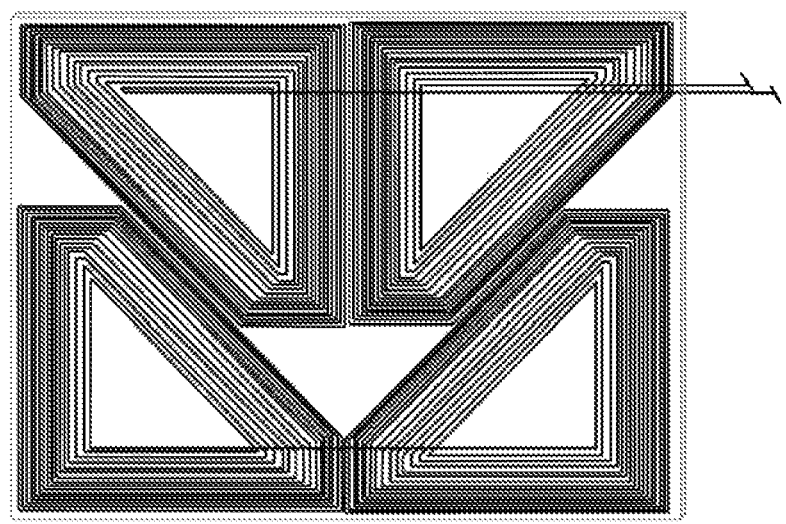
FIG. 5 shows a detail of the planar reception antenna of the data reception system of the master.

The reception circuit is also shown in FIG. 4. A reception winding B2, suitably syntonized to the frequency of the chosen harmonic, provides a voltage which is amplified 13 and displaced so that it is compatible with the digital input of the microcontroller 10. Counting the number of pulses arriving, zeros and ones are differentiated. The reception winding is composed of a set of planar coils (FIG. 5) suitably situated to maximize the detection of the field generated by the magnetic core of the device. The planar coil system is syntonized by means of a tank circuit in order to select the detection frequency. The signal is amplified and rectified and is carried to a microcontroller that counts the pulses and detects levels according to the pulses received.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive system for data transmission/reception by locking the generation of harmonics on a ferromagnetic core, wherein it comprises:
   a first data transceiver (10, 11, 12) comprising:
      i) an element producing an exciter magnetic field (B1) at a defined frequency "w" representative of data to be transmitted to at least one second data transceiver;
      ii) a harmonic detection system;
   at least one second data transceiver (13) comprising:
      i) a core of magnetic material (3) with a non-linear magnetization which generates harmonics of higher order than the frequency of the exciter magnetic field (B1);
      ii) a short-circuit coil (BC, 5) with a resistive impedance at least one hundred times lower than the inductive impedance controlling the generation of harmonics which represents data to be transmitted to the first data transceiver; and
   wherein the harmonic detection system is syntonizable to harmonics of higher order than those generated by the second data transceiver.

2. The inductive system for data transmission/reception by locking the generation of harmonics on a ferromagnetic core according to claim 1, wherein the short-circuit coil (BC, 5) is switched by a switch controlled by an electronic circuit (2).

3. The inductive system for data transmission/reception by locking the generation of harmonics on a ferromagnetic core according to claim 2, an auxiliary winding situated in the first data transceiver can power the electronic circuit (2) controlling the switch of the short-circuit coil situated around the magnetic core (3) such that the data transmission is carried out without interrupting a power supply of said electronic circuit.

4. The inductive system for data transmission/reception by locking the generation of harmonics on a ferromagnetic core according to claim 3, wherein a voltage generated in the short-circuit coil to charge capacitors can power the electronic circuit (2) controlling the switch of the short-circuit coil (BC, 5) situated around the magnetic core (3) to transmit data at a frequency different to the exciter field.

5. The inductive system for data transmission/reception by locking the generation of harmonics on a ferromagnetic core according to claim 2, wherein a voltage generated in the short-circuit coil to charge capacitors can power the electronic circuit (2) controlling the switch of the short-circuit coil (BC, 5) situated around the magnetic core (3) to transmit data at a frequency different to the exciter field.

6. The inductive system for data transmission/reception by locking the generation of harmonics on a ferromagnetic core according to claim 1, wherein the exciter magnetic field (B1) varies at least one parameter selected between: amplitude, frequency and phase, to transmit data to the second transceiver, therefore being bidirectional.

7. The inductive system for data transmission/reception by locking the generation of harmonics on a ferromagnetic core according to claim 1, wherein the defined frequency "w" for the exciter field belongs to a certain range of frequencies, and wherein a variation of said frequency within said certain range allows communication between the first data transceiver and different data transceivers to be selected.

8. A remote anti-theft method comprising deactivating/activating by a switch of a winding comprised in the inductive system for data transmission/reception by locking the generation of harmonics on a ferromagnetic core according to claim 1.

9. A smart induction programmable device (SIPD) wherein it comprises the inductive system for data transmission/reception by locking the generation of harmonics on a ferromagnetic core according to claim 1.

10. The smart induction programmable device (SIPD) according to claim 9, wherein the device comprises a microcontroller which allows data to be recorded and read remotely and therefore allows labels to be developed to monitor products with a different security level, access for different users of the device, given a low consumption in transmitting data and its independence from the excitation frequency.

11. The smart induction programmable device (SIPD) according to claim 9, wherein the device comprises a microcontroller which allows data to be recorded and read remotely and therefore allows labels to be developed to monitor products with tamper-proof areas, access for different users of the device, given a low consumption in transmitting data and its independence from the excitation frequency.

\* \* \* \* \*

UNITED STATES PATENT AND TRADEMARK OFFICE
CERTIFICATE OF CORRECTION

PATENT NO. : 10,607,464 B2
APPLICATION NO. : 16/233279
DATED : March 31, 2020
INVENTOR(S) : Aroca Hernandez-Ros et al.

Page 1 of 1

It is certified that error appears in the above-identified patent and that said Letters Patent is hereby corrected as shown below:

In the Claims

Column 6, Lines 62-63, Claim 7:
After "said frequency within said"
Delete "certain"

Signed and Sealed this
Seventeenth Day of November, 2020

Andrei Iancu
*Director of the United States Patent and Trademark Office*